(12) United States Patent
Mathew et al.

(10) Patent No.: US 11,658,958 B2
(45) Date of Patent: *May 23, 2023

(54) MAINTAINING SESSION STICKINESS ACROSS AUTHENTICATION AND AUTHORIZATION CHANNELS FOR ACCESS MANAGEMENT

(71) Applicant: Oracle International Corporation, Redwood Shores, CA (US)

(72) Inventors: Stephen Mathew, Bangalore (IN); Vipin Anaparakkal Koottayi, Trikarpur (IN); Madhu Martin, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/325,636

(22) Filed: May 20, 2021

(65) Prior Publication Data
US 2021/0281560 A1   Sep. 9, 2021

Related U.S. Application Data

(63) Continuation of application No. 15/987,631, filed on May 23, 2018, now Pat. No. 11,050,730.
(Continued)

(51) Int. Cl.
*H04L 9/40* (2022.01)

(52) U.S. Cl.
CPC ........ *H04L 63/0815* (2013.01); *H04L 63/102* (2013.01); *H04L 63/18* (2013.01); *H04L 63/168* (2013.01)

(58) Field of Classification Search
CPC ... H04L 63/0815; H04L 63/102; H04L 63/18; H04L 63/168
See application file for complete search history.

(56) References Cited

U.S. PATENT DOCUMENTS

| 6,041,357 A | 3/2000 | Kunzelman et al. |
| 6,055,637 A | 4/2000 | Hudson et al. |

(Continued)

FOREIGN PATENT DOCUMENTS

| EP | 1864240 A1 | 12/2007 |
| WO | 2013049461 A2 | 4/2013 |

(Continued)

OTHER PUBLICATIONS

"BIG-IP Access Policy Manager", Available Online at: http://www.f5.com/pdf/products/big-ip-access-policy-manager-ds.pdf, 2013, 13 pages.

(Continued)

*Primary Examiner* — Noura Zoubair
*Assistant Examiner* — Zoha Piyadehghibi Tafaghodi
(74) *Attorney, Agent, or Firm* — Kilpatrick Townsend & Stockton LLP

(57) ABSTRACT

Techniques are described that enable maintaining of session stickiness across authentication and authorization channels in an access management system, through the use an identifier for an access manager from a plurality of access managers. The access manager authenticates a user of a client device based on an authentication request. In response to response to successful authentication of the user, the access manager creates a session. The access manager also generates the identifier and causes the identifier to be stored (Continued)

for the session. The access manager can then receive a second request, which is sent to the access manager based on identifying the access manager using the stored identifier.

18 Claims, 8 Drawing Sheets

Related U.S. Application Data

(60) Provisional application No. 62/564,071, filed on Sep. 27, 2017.

(56) References Cited

U.S. PATENT DOCUMENTS

| | | | |
|---|---|---|---|
| 6,076,108 A | 6/2000 | Courts et al. | |
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,430,619 B1 | 8/2002 | Sitaraman et al. | |
| 6,609,198 B1 | 8/2003 | Wood et al. | |
| 6,811,873 B2 | 11/2004 | Nadkarni | |
| 7,100,195 B1 | 8/2006 | Underwood | |
| 7,137,006 B1* | 11/2006 | Grandcolas | H04L 63/0815 713/180 |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,525,938 B2 | 4/2009 | Hurtta | |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,805,757 B2 | 9/2010 | Menten | |
| 7,818,582 B2 | 10/2010 | Marion et al. | |
| 7,886,000 B1 | 2/2011 | Polis et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,611,873 B2 | 12/2013 | Onyon et al. | |
| 8,627,435 B2 | 1/2014 | Sirota | |
| 8,627,479 B2 | 1/2014 | Wittenstein et al. | |
| 8,650,305 B2 | 2/2014 | Booth et al. | |
| 8,719,342 B2 | 5/2014 | Mutikainen et al. | |
| 8,738,774 B2 | 5/2014 | Sheng et al. | |
| 8,756,704 B2 | 6/2014 | Castellucci et al. | |
| 8,819,444 B2 | 8/2014 | Shahbazi et al. | |
| 8,843,997 B1 | 9/2014 | Hare | |
| 8,898,765 B2 | 11/2014 | Goyal et al. | |
| 8,955,037 B2 | 2/2015 | Srinivasan et al. | |
| 8,990,909 B2 | 3/2015 | Kelley | |
| 9,083,690 B2 | 7/2015 | Subramanya et al. | |
| 9,104,451 B2 | 8/2015 | Subramanya et al. | |
| 9,124,582 B2 | 9/2015 | Kalinichenko et al. | |
| 9,225,744 B1 | 12/2015 | Behm et al. | |
| 9,230,003 B2 | 1/2016 | Goetsch | |
| 9,240,886 B1 | 1/2016 | Allen et al. | |
| 9,247,006 B2 | 1/2016 | Mathew et al. | |
| 9,405,887 B2 | 8/2016 | Yin et al. | |
| 9,509,684 B1 | 11/2016 | Dixson-Boles et al. | |
| 9,544,293 B2 | 1/2017 | Mathew et al. | |
| 9,769,147 B2 | 9/2017 | Mathew et al. | |
| 9,866,640 B2 | 1/2018 | Motukuru et al. | |
| 9,887,978 B2 | 2/2018 | Goel | |
| 9,887,981 B2 | 2/2018 | Mathew et al. | |
| 9,900,224 B2 | 2/2018 | Dumitriu et al. | |
| 10,009,335 B2 | 6/2018 | Mathew et al. | |
| 10,084,769 B2 | 9/2018 | Mathew et al. | |
| 10,157,275 B1 | 12/2018 | Venkatasamy et al. | |
| 10,454,936 B2 | 10/2019 | Koottayi et al. | |
| 10,505,982 B2 | 12/2019 | Motukuru et al. | |
| 10,572,649 B2 | 2/2020 | Mathew et al. | |
| 10,581,826 B2 | 3/2020 | Kukehalli Subramanya et al. | |
| 10,623,501 B2 | 4/2020 | Matthew et al. | |
| 10,693,859 B2 | 6/2020 | Kukehalli Subramanya et al. | |
| 10,693,864 B2 | 6/2020 | Mathew et al. | |
| 11,050,730 B2 | 6/2021 | Mathew et al. | |
| 11,134,078 B2 | 9/2021 | Kukreja et al. | |
| 2002/0029269 A1 | 3/2002 | McCarty et al. | |
| 2002/0078365 A1 | 6/2002 | Burnett et al. | |
| 2002/0133723 A1* | 9/2002 | Tait | H04L 63/0815 713/150 |
| 2003/0105862 A1 | 6/2003 | Villavicencio | |
| 2003/0212887 A1 | 11/2003 | Walther et al. | |
| 2004/0003259 A1 | 1/2004 | Chang | |
| 2004/0073666 A1 | 4/2004 | Foster et al. | |
| 2004/0260810 A1 | 12/2004 | Bernoth | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1 | 6/2005 | Anuszewski | |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0089167 A1 | 4/2007 | Villavicencio | |
| 2007/0147247 A1 | 6/2007 | Kalonji et al. | |
| 2007/0192326 A1 | 8/2007 | Angal et al. | |
| 2007/0220154 A1 | 9/2007 | El Husseini et al. | |
| 2008/0066159 A1 | 3/2008 | Dillaway et al. | |
| 2008/0113791 A1 | 5/2008 | Williams et al. | |
| 2008/0114883 A1 | 5/2008 | Singh et al. | |
| 2008/0294781 A1 | 11/2008 | Hinton et al. | |
| 2009/0037581 A1 | 2/2009 | Richardson et al. | |
| 2009/0037763 A1 | 2/2009 | Adhya et al. | |
| 2009/0047928 A1 | 2/2009 | Utsch et al. | |
| 2009/0089437 A1 | 4/2009 | Polozoff | |
| 2009/0132639 A1 | 5/2009 | Yan | |
| 2009/0216587 A1 | 8/2009 | Dwivedi et al. | |
| 2009/0292927 A1 | 11/2009 | Wenzel et al. | |
| 2010/0043062 A1 | 2/2010 | Alexander et al. | |
| 2010/0082989 A1 | 4/2010 | Bussard et al. | |
| 2010/0131755 A1 | 5/2010 | Zhu et al. | |
| 2010/0146611 A1 | 6/2010 | Kuzin et al. | |
| 2010/0154043 A1 | 6/2010 | Castellucci et al. | |
| 2010/0217837 A1 | 8/2010 | Ansari et al. | |
| 2010/0290392 A1 | 11/2010 | Rasanen et al. | |
| 2011/0010542 A1 | 1/2011 | Choi et al. | |
| 2011/0154443 A1 | 6/2011 | Thakur et al. | |
| 2011/0154465 A1* | 6/2011 | Kuzin | H04L 67/08 726/9 |
| 2011/0173643 A1 | 7/2011 | Nicolson et al. | |
| 2011/0185421 A1 | 7/2011 | Wittenstein et al. | |
| 2011/0277019 A1 | 11/2011 | Pritchard, Jr. | |
| 2011/0307615 A1 | 12/2011 | Krishnaswamy et al. | |
| 2012/0078708 A1 | 3/2012 | Taylor et al. | |
| 2012/0106333 A1 | 5/2012 | Lee et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0081130 A1 | 3/2013 | Huba et al. | |
| 2013/0086651 A1 | 4/2013 | Kavantzas et al. | |
| 2013/0086652 A1 | 4/2013 | Kavantzas et al. | |
| 2013/0185449 A1 | 7/2013 | Brzozowski | |
| 2013/0198818 A1 | 8/2013 | Hitchcock et al. | |
| 2014/0025939 A1 | 1/2014 | Smith et al. | |
| 2014/0068702 A1 | 3/2014 | Hyndman et al. | |
| 2014/0149280 A1 | 5/2014 | Karkhanis et al. | |
| 2014/0259109 A1 | 9/2014 | Houston et al. | |

(56) References Cited

U.S. PATENT DOCUMENTS

| | | | |
|---|---|---|---|
| 2014/0282940 A1* | 9/2014 | Williams | H04L 63/0807 726/6 |
| 2014/0282961 A1 | 9/2014 | Dorfman et al. | |
| 2014/0304773 A1 | 10/2014 | Woods et al. | |
| 2014/0344326 A1 | 11/2014 | Kamath et al. | |
| 2015/0059003 A1 | 2/2015 | Bouse | |
| 2015/0074407 A1 | 3/2015 | Palmeri et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 | 5/2015 | Eguchi | |
| 2015/0220713 A1 | 8/2015 | Beenau et al. | |
| 2015/0220926 A1 | 8/2015 | Mclachlan et al. | |
| 2016/0004870 A1 | 1/2016 | Forte et al. | |
| 2016/0028737 A1 | 1/2016 | Srinivasan et al. | |
| 2016/0065570 A1 | 3/2016 | Spencer, III et al. | |
| 2016/0219040 A1 | 7/2016 | Mathew et al. | |
| 2016/0232516 A1 | 8/2016 | Dayan et al. | |
| 2016/0248758 A1 | 8/2016 | Mathew et al. | |
| 2016/0285822 A1 | 9/2016 | Adams | |
| 2016/0294607 A1 | 10/2016 | Davis | |
| 2016/0380941 A1 | 12/2016 | Tanurdjaja et al. | |
| 2016/0380984 A1 | 12/2016 | Johnson et al. | |
| 2016/0381000 A1 | 12/2016 | Mathew et al. | |
| 2017/0034152 A1 | 2/2017 | Subramanya et al. | |
| 2017/0041296 A1 | 2/2017 | Ford et al. | |
| 2017/0085556 A1 | 3/2017 | Mathew et al. | |
| 2017/0118218 A1 | 4/2017 | Koottayi et al. | |
| 2017/0118222 A1 | 4/2017 | Subramanya et al. | |
| 2017/0118249 A1 | 4/2017 | Motukuru et al. | |
| 2017/0126689 A1 | 5/2017 | Lloyd et al. | |
| 2017/0201524 A1 | 7/2017 | Dureau | |
| 2017/0372055 A1 | 12/2017 | Robinson et al. | |
| 2018/0046794 A1 | 2/2018 | Mathew et al. | |
| 2018/0077243 A1 | 3/2018 | Mathew et al. | |
| 2018/0157825 A1 | 6/2018 | Eksten et al. | |
| 2018/0191701 A1 | 7/2018 | Kong et al. | |
| 2019/0014102 A1 | 1/2019 | Mathew et al. | |

FOREIGN PATENT DOCUMENTS

| | | |
|---|---|---|
| WO | 2015042546 A1 | 3/2015 |
| WO | 2015042547 A1 | 3/2015 |
| WO | 2016051240 A1 | 4/2016 |

OTHER PUBLICATIONS

"Configuring VMware Identity Manager for Multiple Data Centers", Technical White Paper: VMware Identity Manager 2.8, Available Online at: https://www.vmware.com/content/dam/digitalmarketing/vmware/en/pdf/techpaper/vmware-identity-manager-multiple-data-center-configuration.pdf, Dec. 2016, 16 pages.

"Developing an Application to Manage Impersonation", Fusion Middleware, Developer's Guide for Oracle Access Management, Nov. 2012, 10 pages.

"Dual Factor Authentication", Reliance, Oct. 24, 2016, 8 pages.

"IBM Security Access Manager for Enterprise Single Sign-On", Available Online at: http://www-03.ibm.com/software/products/en/access-mgr-esso, Nov. 10, 2016, 2 pages.

"IBM Security Access Manager for Enterprise Single Sign-On", Available Online at: http://onwireco.com/wpcontent/uploads/2013/12/IBM_Security_Access_Manager_For_Enterprise_Single_Sign-On.pdf, 2013, 8 pages.

"Impersonate Another User: Dynamics CRM", Available Online at: https://msdn.microsoft.com/en-us/library/gg334744(v=crm.7).aspx, 2015, 1 page.

"Implementing Single Sign-On Across Multiple Organizations", Available Online at: https://developer.salesforce.com/page/Lmplementing_Single_Sign-On_Across_Multiple_Organizations, Dec. 19, 2013, 8 pages.

"Installing vCenter Single Sign-On in a Multisite Deployment", Available Online at: http://kb.vmware.com/selfservice/microsites/search.do;language=en_US&cmd=displayKC&externalId=2034074, 2014, 2 pages.

"Multi-Data Center with Session Sharing", IBM Security Access Manager for Web, Version 7.0, Available Online at: https://www.ibm.com/support/knowledgecenter/SSPREK_7.0.0/com.ibm.isam.doc_70/ameb_smsdeploy_guide/concept/c_multi_data_center_with_session.html, 2017, 3 pages.

"Multiple Data Centers", Available Online at: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452, 2014, 8 pages.

"Oracle Enterprise Single Sign-On Suite Plus 11gR2 PS2", Available Online at: http://www.oracle.com/technetwork/middleware/id-mgmt/esso-suite-technical-whitepaper-1519077.pdf, Jan. 2014, 25 pages.

"Oracle Fusion Middleware Developer's Guide for Oracle Access Management", Developing an Application to Manage Impersonation, Available Online at: https://docs.oracle.com/cd/E52734_01/oam/AIDEV/impersonation.htm#AIDEV422, 2015, 11 pages.

"Oracle Fusion Middleware Developing Web Applications", Using Sessions and Session Persistence, Available Online at: http://docs.oracle.com/cd/E12839_01/web.1111/e13712/sessions.htm#WBAPP301, May 2009, 6 pages.

"Oracle Fusion Middleware Performance and Tuning for Oracle WebLogic Server", Available Online at: http://docs.oracle.com/cd/E12839_01/web.1111/e13814/webapptune.htm#PERFM368, 2015, 3 pages.

"RSA Adaptive Authentication", RSA Security Product Literature, Available Online at: https://www.rsa.com/en-us/products/fraud-prevention/3d-secure-authentication, 2016, 4 pages.

Symantec Identity: Access Manager, Available Online at: http://www.symantec.com/content/en/us/enterprise/fact_sheets/b-symantec_identity_access_manager_DS_21227840, 2014, 2 pages.

"The ABCs of ADCs", White Paper: ABCs of Application Delivery, Available Online at: https://www.fortinet.com/content/dam/fortinet/assets/white-papers/FortiADC-ABCs.pdf, 2014, 8 pages.

"The Art of Logging Out", Available Online at: https://www.kth.se/social/group/cas/page/the-art-of-logging-out, Apr. 26, 2013, 2 pages.

"Understanding Jive Mobile's SSO Compliance", Jive Software, Available Online at: https://community.jivesoftware.com/docs/DOC-61829, Jun. 25, 2012, 11 pages.

"User Session Monitoring for CA Single Sign-On", Available Online at: https://www.ca.com/content/dam/ca/us/files/service-offering/user-session-monitor-for-ca-single-sign-on.pdf, 2015, 1 page.

U.S. Appl. No. 14/135,053 , "Final Office Action", dated Jul. 6, 2015, 17 pages.

U.S. Appl. No. 14/135,053 , "Non-Final Office Action", dated Jan. 29, 2015, 16 pages.

U.S. Appl. No. 14/135,053 , "Non-Final Office Action", dated Nov. 25, 2015, 18 pages.

U.S. Appl. No. 14/135,053 , "Notice of Allowance", dated May 20, 2016, 10 pages.

U.S. Appl. No. 14/135,053 , "Notice of Allowance", dated Aug. 31, 2016, 9 pages.

U.S. Appl. No. 14/137,775 , "Non-Final Office Action", dated May 22, 2015, 10 pages.

U.S. Appl. No. 14/137,775 , "Notice of Allowance", dated Sep. 16, 2015, 9 pages.

(56) References Cited

OTHER PUBLICATIONS

U.S. Appl. No. 14/491,076 , "Final Office Action", dated Oct. 25, 2016, 19 pages.
U.S. Appl. No. 14/491,076 , "Final Office Action", dated Oct. 6, 2016, 19 pages.
U.S. Appl. No. 14/491,076 , "Non-Final Office Action", dated Mar. 11, 2016, 13 pages.
U.S. Appl. No. 14/491,076 , "Notice of Allowance", dated Nov. 2, 2017, 11 pages.
U.S. Appl. No. 14/754,222 , "Non-Final Office Action", dated Dec. 1, 2016, 10 pages.
U.S. Appl. No. 14/754,222 , "Notice of Allowance", dated May 17, 2017, 5 pages.
U.S. Appl. No. 14/754,222 , "U.S. Non-Provisional Application No ", Session Activity Tracking for Session Adoption Across Multiple Data Centers, Jun. 29, 2015, 69 pages.
U.S. Appl. No. 14/814,209 , "Final Office Action", dated Jul. 31, 2017, 19 pages.
U.S. Appl. No. 14/814,209 , "Final Office Action", dated Jan. 4, 2019, 21 pages.
U.S. Appl. No. 14/814,209 , "Non-Final Office Action", dated Jan. 11, 2017, 13 pages.
U.S. Appl. No. 14/814,209 , "Non-Final Office Action", dated Aug. 19, 2019, 20 pages.
U.S. Appl. No. 14/814,209 , "Non-Final Office Action", dated May 14, 2018, 20 pages.
U.S. Appl. No. 14/814,209 , "Notice of Allowance", dated Feb. 25, 2020, 9 pages.
U.S. Appl. No. 15/005,365 , "Final Office Action", dated Mar. 10, 2017, 12 pages.
U.S. Appl. No. 15/005,365 , "Non-Final Office Action", dated Aug. 24, 2016, 11 pages.
U.S. Appl. No. 15/005,365 , "Notice of Allowance", dated Sep. 27, 2017, 16 pages.
U.S. Appl. No. 15/143,240 , "Final Office Action", dated Dec. 15, 2017, 14 pages.
U.S. Appl. No. 15/143,240 , "Non-Final Office Action", dated Jun. 5, 2017, 11 pages.
U.S. Appl. No. 15/143,240 , "Notice of Allowance", dated May 24, 2018, 15 pages.
U.S. Appl. No. 15/291,804 , "First Action Interview Office Action Summary", dated Jun. 17, 2019, 5 pages.
U.S. Appl. No. 15/291,804 , "First Action Interview Pilot Program Pre-Interview Communication", dated Jan. 11, 2019, 4 pages.
U.S. Appl. No. 15/291,804 , "Notice of Allowance", dated Oct. 22, 2019, 12 pages.
U.S. Appl. No. 15/331,211 , "Advisory Action", dated Feb. 4, 2019, 5 pages.
U.S. Appl. No. 15/331,211 , "Corrected Notice of Allowability", dated Oct. 15, 2019, 3 pages.
U.S. Appl. No. 15/331,211 , "Final Office Action", dated Oct. 16, 2018, 34 pages.
U.S. Appl. No. 15/331,211 , "Non-Final Office Action", dated Jun. 6, 2018, 26 pages.
U.S. Appl. No. 15/331,211 , "Notice of Allowance", dated Aug. 15, 2019, 22 pages.
U.S. Appl. No. 15/331,613 , "First Action Interview Office Action Summary", dated May 29, 2019, 7 pages.
U.S. Appl. No. 15/331,613 , "First Action Interview Pilot Program Pre-Interview Communication", dated Jan. 4, 2019, 5 pages.
U.S. Appl. No. 15/331,613 , "Notice of Allowance", dated Aug. 21, 2019, 12 pages.
U.S. Appl. No. 15/331,613 , "Notice of Allowance", dated Jul. 9, 2019, 19 pages.
U.S. Appl. No. 15/356,384 , "Corrected Notice of Allowability", dated Mar. 17, 2020, 7 pages.
U.S. Appl. No. 15/356,384 , "First Action Interview Pilot Program Pre-Interview Communication", dated Feb. 8, 2019, 5 pages.
U.S. Appl. No. 15/356,384 , "Notice of Allowance", dated Oct. 30, 2019, 8 pages.
U.S. Appl. No. 15/356,384 , "Notice of Allowance", dated Jun. 12, 2019, 9 pages.
U.S. Appl. No. 15/372,342 , "Non-Final Office Action", dated Oct. 20, 2017, 14 pages.
U.S. Appl. No. 15/372,342 , "Notice of Allowance", dated Mar. 13, 2018, 12 pages.
U.S. Appl. No. 15/707,261 , "Final Office Action", dated Mar. 8, 2019, 6 pages.
U.S. Appl. No. 15/707,261 , "Non-Final Office Action", dated Sep. 13, 2018, 10 pages.
U.S. Appl. No. 15/707,261 , "Notice of Allowance", dated Jun. 27, 2019, 5 pages.
U.S. Appl. No. 15/707,261 , "Notice of Allowance", dated Oct. 11, 2019, 5 pages.
U.S. Appl. No. 15/782,700 , "Non-Final Office Action", dated Jan. 26, 2018, 7 pages.
U.S. Appl. No. 15/782,700 , "Notice of Allowance", dated Aug. 8, 2018, 13 pages.
U.S. Appl. No. 15/784,029 , "Final Office Action", dated Mar. 5, 2020, 26 pages.
U.S. Appl. No. 15/784,029 , "Non-Final Office Action", dated Aug. 22, 2019, 14 pages.
U.S. Appl. No. 15/784,029 , "Non-Final Office Action", dated Dec. 24, 2020, 27 pages.
U.S. Appl. No. 15/987,631 , "Final Office Action", dated Sep. 16, 2020, 14 pages.
U.S. Appl. No. 15/987,631 , "Non-Final Office Action", dated Mar. 3, 2020, 12 pages.
U.S. Appl. No. 15/987,631 , "Notice of Allowance", dated Apr. 30, 2021, 11 pages.
U.S. Appl. No. 16/140,343 , "Non-Final Office Action", dated Aug. 7, 2019, 11 pages.
U.S. Appl. No. 16/140,343 , "Notice of Allowance", dated Feb. 7, 2020, 8 pages.
U.S. Appl. No. 61/880,335 , "U.S. Provisional Application No. ", Multiple Resource Servers with Single, Flexible, Pluggable Oauth Server and Oauth-protected Restful Oauth Consent Management Service, and Mobile Application Single Sign on Oauth Service, Sep. 20, 2013, 154 pages.
U.S. Appl. No. 61/880,400 , "U.S. Provisional Application No.", Single Sign-On Between Multiple Data Centers, Sep. 20, 2013, 50 pages.
U.S. Appl. No. 61/880,569 , "U.S. Provisional Application No. ", Adaptive Authentication for Enterprise Software Environments, Sep. 20, 2013, 22 pages.
U.S. Appl. No. 61/880,598 , "U.S. Provisional Application No. ", Cookie Based Session Management, Sep. 20, 2013, 34 pages.
Dacosta et al., "One-Time Cookies: Preventing Session Hijacking Attacks with Stateless Authentication Tokens", Association for Computing Machinery Transactions on Internet Technology, vol. 12, No. 1, Jun. 2012, 31 pages.
Ferguson et al., "Session Management Server: Session Transitions and State", Available Online at: http://www.ibm.com/developerworks/tivoli/library/t-sms-states/, Jun. 25, 2007, 7 pages.
Gaur , "IBM Extreme Transaction Processing (XTP) Patterns: Scalable and Robust HTTP Session Management with WebSphere eXtreme Scale", Available Online at: http://www.ibm.com/developerworks/websphere/library/techarticles/0905_gaur/0905_gaur.html, May 27, 2009, 8 pages.
Haire , "A Solution to SSO Authentication and Identity Management: Lessons Learned", Atlassian Blog, May 16, 2013, 5 pages.
Heo et al., "Statistical SIP Traffic Modeling and Analysis System", 10th International Symposium on Communications and Information Technologies, Oct. 2010, pp. 1223-1228.
Izumi et al., "Toward Practical Use of Virtual Smartphone", The Institute of Electrical and Electronics Engineers 9th Asia-Pacific Symposium on Information and Telecommunication Technologies, Dec. 12, 2012, 5 pages.
Maruyama et al., "Dynamic Route Selection Algorithms for Session Based Communication Networks", Association for Computing Machinery, vol. 13, No. 2, Apr. 1983, pp. 162-169.

(56) References Cited

OTHER PUBLICATIONS

Menasce et al., "Resource Management Policies for E-Commerce Servers", Association for Computing Machinery Sigmetrics Performance Evaluation Review, vol. 27, No. 4, Mar. 2000, pp. 27-35.
Mortimore et al., "Implementing Single Sign-On Across Multiple Organizations", Available Online at: https://developer.salesforce.com/page!lmplementing_Single_Sign-On_Across_Multiple_Organizations, Oct. 2014, 15 pages.
Murdoch, "Hardened Stateless Session Cookies", In International Workshop on Security Protocols, Apr. 2008, 9 pages.
Nagalakshmi et al., "Confident Multi-Factor Authentication on Web Application Via Captcha Technologies", International Journal of Computer Engineering in Research Trends, vol. 2, No. 8, Aug. 2015, pp. 516-522.
Pujolle et al., "Secure Session Management with Cookies", 7th International Conference on Information, Communications and Signal Processing, 2009, 6 pages.
Rivard, "Clearing Novell Access Manager Application Sessions", Available Online at: https://www.netiq.com/communities/cool-solutions/clearing-novell-access-manager-application-sessions/, Jan. 26, 2009, 4 pages.
Samar, "Single Sign-On Using Cookies for Web Applications", Institute of Electrical and Electronics Engineers 8th International Workshops on Enabling Technologies: Infrastructure for Collaborative Enterprises, 1999, pp. 158-163.
Stirpe et al., "Time-Out Management in Multi-Domain Single Sign-On", Available Online at: http://www.strattagroup.com/tsg/pubs/ssotime-out.pdf, 2005, 13 pages.
Volodarsky et al., "Fast, Scalable, and Secure Session State Management for Your Web Applications", Available Online at: https://msdn.microsoft.com/enus/magazine/cc163730.aspx, 2015, 9 pages.
Ye, "A Complete Impersonation Demo", Available Online at: http://www.codeproject.com/Articles/125810/A-complete-lmpersonation-Demo-in-Csharp-NET, Jun. 20, 2013, 12 pages.
U.S. Appl. No. 15/784,029, Notice of Allowance dated Jan. 27, 2022, 10 pages.
U.S. Appl. No. 16/507,641, Corrected Notice of Allowability dated Aug. 5, 2021, 4 pages.
U.S. Appl. No. 15/784,029, Final Office Action dated Jul. 8, 2021, 26 pages.
U.S. Appl. No. 16/507,641, Notice of Allowance dated Jun. 30, 2021, 11 pages.
U.S. Appl. No. 15/784,029, Corrected Notice of Allowability dated Feb. 18, 2022, 2 pages.
U.S. Appl. No. 15/784,029, Advisory Action dated Nov. 4, 2021, 7 pages.

\* cited by examiner

MAINTAINING SESSION STICKINESS ACROSS AUTHENTICATION AND AUTHORIZATION CHANNELS FOR ACCESS MANAGEMENT

RELATED APPLICATIONS

This application is a continuation of U.S. application Ser. No. 15/987,631, filed on May 23, 2018, which claims priority under 35 U.S.C. § 119(e) to U.S. Provisional Patent Application No. 62/564,071, entitled "Techniques for Session Stickiness Across Authentication and Authorization Channels for Access Management," filed on Sep. 27, 2017, the disclosure of which is hereby incorporated by reference in its entirety for all purposes.

BACKGROUND

Networks of computer systems, such as an enterprise computer network, may store various resources that a user may wish to access at a client device. These resources may include files, such as documents, images, presentation slides, and spreadsheets, network resources, such as processing power, cloud storage, and network communication bandwidth, and any other resources in an enterprise computer network. These resources may be protected, for which a user may need to be authenticated and authorized before being able to access the protected resource.

In particular, businesses may rely on a variety of applications and systems to manage such resources and otherwise control and generate information that is critical to business operations. Different applications may provide different services and information, and different users may require access to different levels of information within each application or system. The level of access that users are granted may depend on the role of the user. For example, a manager may need access to certain information about employees that report to him, but it may be improper for that manager to access the same information about those whom he reports to. Similarly, a manager may access certain files or company information that employees do not have access to and may be barred from accessing certain files or company information that higher level managers may have access to.

Earlier applications may incorporate access management business logic directly into the application code. That is to say, each application may require users to have a separate account, policy logic, and permissions. Further, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources for managing users' access to resources stored on computer systems became known as an access management system.

BRIEF SUMMARY

The present disclosure relates generally to techniques for operating an access management system (AMS), which may facilitate and provide access to resources on a computer system or a network of multiple computer systems and/or data centers. These resources may include files, such as documents and images, computer system resources, such as processing power and memory, and network resources, such as network communication bandwidth and cloud storage, or any other resources in a computer network. Various embodiments are described herein, including methods, systems, non-transitory computer-readable storage media storing programs, code, or instructions executable by one or more processors, and the like.

Specifically, an AMS may comprise one or more access managers and one or more access management agents that work together to facilitate user access to resources, including performing operations involved in authenticating the user's credentials and authorizing the user's access to various resources. The access managers make authentication and authorization decisions and can be located in the same data center or in different data centers. Within a data center, access managers can be separated into different groups (e.g., server clusters). Multiple access managers may be available for handling authentication or authorization requests. As will be explained, example embodiments of the present disclosure are directed to techniques for directing subsequent requests to the same access manager that initially authenticated or authorized the user.

Once a user has been authenticated or when access to a resource has been authorized, an access manager may establish a session, such as a single sign-on (SSO) session. A session generally begins with an initial authentication of the user in response to the user's request to access a protected resource. SSO can provide a user with access to multiple systems and applications after an initial login. For example, when the user logs-in to their work computer, the user can then also have access to one or more other resources, such as systems and applications, without having to re-authenticate. Thus, information can be stored for the session so that subsequent requests received during the session may not require re-authentication of the user. This information can include information about the user's credentials and privileges, such as information indicating that the user has been successfully authenticated based on an earlier supplied credential and what level of access the user has been given. Sessions can be time-limited so that after a certain time period, the user will need to re-authenticate. A subsequent request for the same or a different resource may sometimes trigger a new authorization request even though the subsequent request is received during the same session.

Authentication and authorization operations may be performed over different communication channels, including a front-end communication channel for authentication operations and a separate back-end communication channel for authorization operations. Because these communication channels may be managed independently of one another, a request to authenticate a user may be sent to an access manager at one computer system, server, server cluster, or data center, while a subsequent request to authorize the user's resource access may be sent to a new access manager at a different computer system, server, server cluster, and/or data center. Consequently, the AMS may need to transfer session information to the new access manager across computer systems or data centers, which may be located in different places geographically. The AMS may also need to set up a new session at the new access manager in order to process the subsequent request. For example, information for a session may be stored in a distributed cache so that setting up a new session would require fetching the session information from the distributed cache and recreating the session information locally in a second distributed cache that is associated with the new access manager. These processes may be resource intensive and time consuming depending on the amount of information that needs to be transferred and how much computational and network resources are available.

The techniques discussed in the present application address these and other challenges. In particular, systems and techniques are provided for managing and maintaining session stickiness across authentication and authorization channels by using an identifier to direct requests for authentication and authorization to the same access manager that created a session. In this way, the present approach avoids having to transfer session information or create new sessions. The identifier can be stored in a token, which may be generated at an access manager upon successful authentication of a user requesting access to a protected resource, and then passed to an access management agent for use in subsequent authentications of the user and/or subsequent authorizations for the user to access a protected resource. Both the session and the token may be active within a predetermined time window, during which they may facilitate subsequent authentications and authorizations such that additional input from the user is not required.

In some embodiments, a computer-implemented method, performed at a first access manager from a plurality of access managers, includes authenticating a user of a client device based on an authentication request; creating a session in response to successful authentication of the user; generating an identifier that identifies the first access manager; causing the identifier to be stored for the session; and receiving a second request during the session, wherein the second request is sent to the first access manager based on identifying the first access manager using the stored identifier.

In some embodiments, a system may be provided that includes a memory or other computer-readable storage medium storing a plurality of instructions. The system may further include one or more processors configured to execute the plurality of instructions, which cause the one or more processors to authenticate a user of a client device based on an authentication request; create a session in response to successful authentication of the user; generate an identifier that identifies the first access manager; cause the identifier to be stored for the session; and receive a second request during the session, wherein the second request is sent to the first access manager based on identifying the first access manager using the stored identifier.

In at least one embodiment, tokens for managing access may be utilized to store an identifier of an access manager to enable subsequent requests to be directed to the access manager. The identifier may be used to maintain session stickiness (e.g., for an SSO session) across multiple communication channels for multiple computer systems, each computer system including one or more access managers. The identifier of the access manager may include one or more items of information that alone or in combination with each other serve to uniquely identify the access manager. For example the identifier may include an identifier of a group of access managers that the access manager belongs to (e.g., a cluster identifier that identifies a single server cluster from among a plurality of server clusters that form a data center). The identifier may further include a server name or other access manager identifying information. An access management agent, such as a webgate, may be implemented to direct requests to the access manager that manages the session for a user. The webgate may check an identifier in a token to determine a cluster to which to send requests that are received during an existing session. Thus, the identifier can be a combination of a cluster identifier and a server name, e.g., "clusterid:servername."

The identifier can be transmitted to the webgate as part of a token (e.g., a cookie). The webgate may store a configuration file that the webgate uses to resolve the identifier (e.g., "clusterid:servername") to the specific access manager, e.g., based on a mapping of the identifier to a network address of the access manager. Thus, the identifier may enable the webgate to send subsequent requests to the same access manager that is identified by the identifier. Additionally, when the identifier is transmitted together with a subsequent request, any intervening entities that receive the request can also process the identifier to ensure that the request is sent to the same access manager. For example, the request may be transmitted from the webgate to a load balancer configured to select an access manager to send the request to. The identifier may cause the load balancer to override any existing rules that may be in place for selecting an access manager, so that the request will be directed to the identified access manager. With this mechanism, session stickiness can be established to a particular instance of an access manager across multiple communication channels and/or multiple data centers.

In some embodiments, the identifier may identify multiple access managers. Such an identifier can be used to establish a specific order in which the access managers are to be contacted for handling subsequent requests. For example, the identifier may define an ordered list of access managers so that a request may be directed to the next access manager in the list if the first identified access manager becomes unavailable for handling a subsequent request.

In at least one embodiment, an access management system implements a process to manage stickiness of a session. When a user initiates a request for a protected resource without having been authenticated, a webgate may intercept the request to initiate an authentication flow. For authentication, the webgate may redirect the request to an access manager through a Hypertext Transfer Protocol (HTTP) communication channel. The access manager may be selected from among a plurality of access managers based on one or more configurations. For example, the configurations may be defined based on one or more criteria indicating a computer system for affinity (e.g., a geographic affinity), preference, or stickiness. The access manager, upon successful authentication, may create a server side session, e.g., an SSO session. Multiple tokens may be created for controlling access during the session, such as an authentication token and an authorization token. Each token may be modified to include an identifier of the access manager that creates the session. Each token may be encrypted upon creation and may be transmitted to a webgate, e.g., the same webgate that sent the authentication request. The webgate receiving the token may access the encrypted contents of the token to direct a subsequent request to the same access manager.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. The foregoing, together with other features and embodiments, will become more apparent upon referring to the following specification, claims, and accompanying drawings.

DETAILED DESCRIPTION

Figure 1:
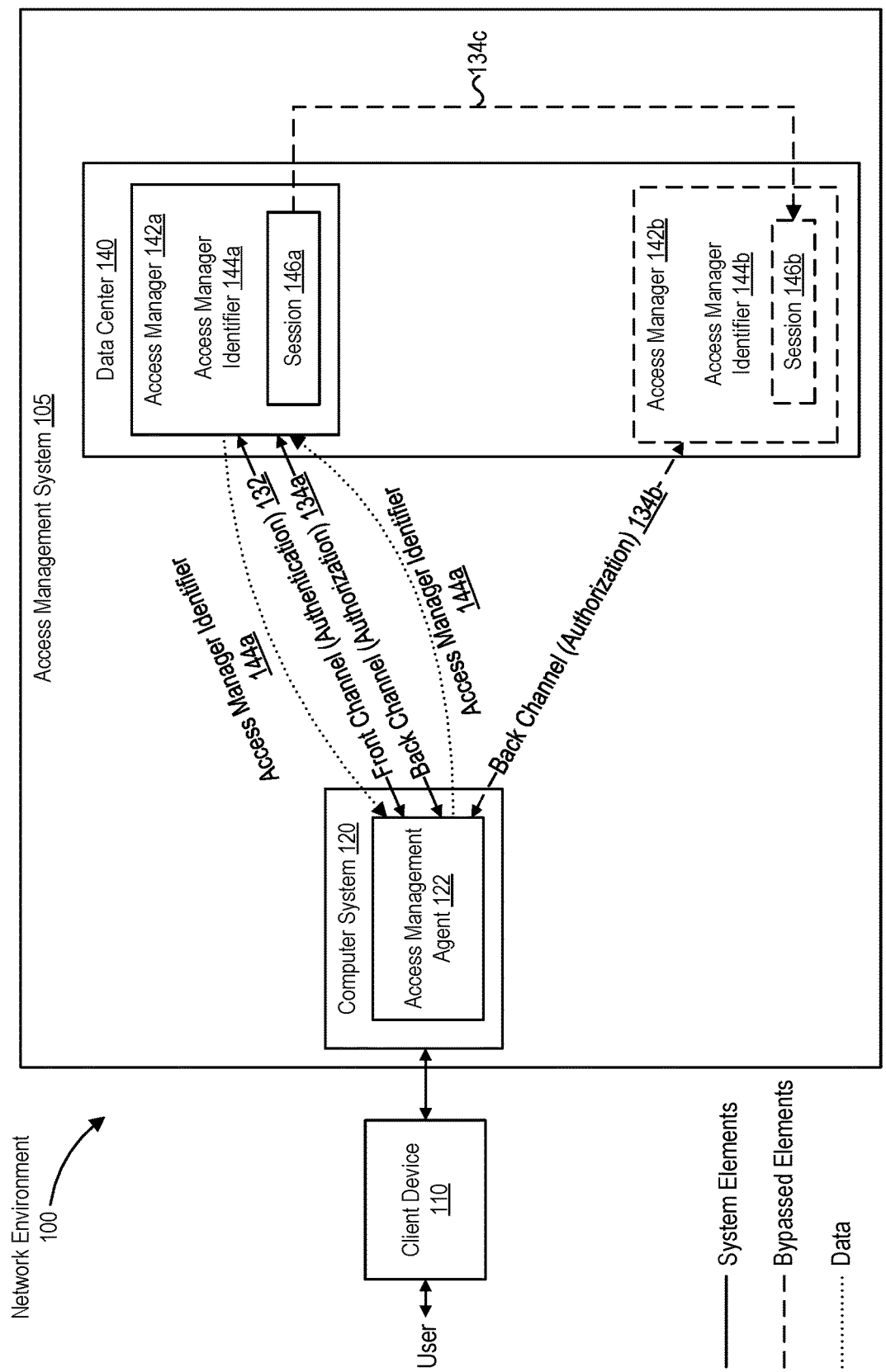
FIG. 1 illustrates a network environment for maintaining session stickiness across authentication and authorization channels, in accordance with an embodiment.

In the following description, for the purposes of explanation, specific details are set forth in order to provide a thorough understanding of embodiments of the present disclosure. However, it will be apparent that various embodiments may be practiced without these specific details. For example, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the present disclosure as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Networks of computer systems, such as an enterprise computer network, may be used to meet the computing needs of organizations, such as businesses, universities, government organizations, or the like. The enterprise computer network infrastructure may be spread over one or more data centers that may be dispersed over different geographic locations. Various resources included within an enterprise computer network may be managed and/or stored by the one or more data centers. Resources may include any item managed and/or stored by the data centers and available for access by one or more users, including files, such as documents, spreadsheets, and images, computational resources, such as processing power, cloud storage, and network communication bandwidth, and software applications, and/or the like. A resource may be protected or unprotected. If a resource is protected, a user may need to be authenticated and authorized in order to access the resource.

Authentication and authorization may be managed by an AMS. An AMS may comprise one or more access managers (which may also be referred to herein as access management providers) and one or more access management agents. Access managers may receive and process authentication and authorization requests and return a decision as to whether such requests are granted or denied. An access manager can be a server that has the processing, memory, and communication capabilities to perform authentications and authorizations. The server can be a physical server implemented as one or more computer systems having various hardware components, or a virtualized server that is instantiated on one or more computer systems, or any other arrangement or combinations of arrangements.

Access managers can be implemented on the same or different servers, computer systems, and/or data centers. In particular, access managers may be deployed across multiple data centers (which can be geographically located together or dispersed) to ensure high availability and facilitate disaster recovery in the event of failure at one or more access managers. At a given data center, access managers may further be deployed in a clustered topology with multiple access managers configured behind one or more load balancers, such as a load balancing router, that determines which access manager should receive each authentication and authorization request.

From the perspective of a client device, an AMS may operate as a single logical access server that provides SSO functionality for all of the applications managed by the AMS, even though the AMS may include multiple data centers and/or access managers. Using an SSO session, a user can log into one data center and then access other data centers without logging in again for the same SSO session. For example, SSO allows a user to enter a username/password once in order to gain access to multiple associated resources managed by other data centers. Different data centers may manage access to different resources. As such, SSO can allow a user having access to one data center to access multiple resources from other data centers based on the SSO for the user.

Access management agents may intercept resource access requests and work with the one or more access managers to facilitate authentications and authorizations. An access management agent can be implemented as a standalone device, a computer system, a software application hosted by a computer system or server, or any other implementation suitable for facilitating authentications and authorizations and communicating with access managers. Different access management agents may also be implemented on the same or different servers, computer systems, and/or data centers as with respect to each other. In addition, access management agents may also be implemented on the same or different servers, computer systems, and/or data centers as with respect to access managers. It is understood that other arrangements and implementations of access managers and access management agents are possible in alternative embodiments.

A communications architecture having one or more communication channels can be used to connect access management agents and access managers and facilitate authentications and authorizations. These channels may include a front-end communication channel for authentications and other communications between access managers and access management agents, and a back-end communication channel for authorizations and other communications between access managers and access management agents. Each communication channel may use a different communication protocol. For example, authentication requests and related communications may be transferred using HTTP, while authorization requests and related communications may be transferred using Oracle Access Protocol (OAP). In this way, communications related to authentication may go through a different communication channel and use a different communication protocol from communications related to authorizations.

In addition, communication channels may be managed by one or more load balancers, such as load balancing routers. Load balancers help choose where to send communications, such as authentication and authorization requests, from among multiple network elements, such as multiple access managers. For example, once a session is created at one access manager in response to a user request to access a resource, the load balancer may maintain stickiness and/or affinity between the user and the session by routing subsequent requests related to the same resource, user, and/or client device to the same access manager. This avoids having to recreate and/or adopt the session in another access manager, thereby saving time and computational resources while improving network security by maintaining fewer data transfers over communication channels in the computer network.

Different load balancers may be used for front-end and back-end communication channels. Accordingly, efforts to maintain session stickiness and/or affinity by a first load balancer for a front-end communication channel may not be preserved by a load balancer for a back-end communication channel since the second load balancer may not have access to information regarding which access manager the first load balancer was routing to for any given user, client device, and requested resource. As a result, session stickiness and/or affinity may not be maintained across front-end communication channels used for authentication and back-end communication channels used for authorizations. Consequently, authentication and authorization requests may be routed to different access managers, thus requiring sessions to be recreated and/or adopted from one access manager to another, potentially across long distances and multiple data centers. In order to overcome this problem, embodiments of the present disclosure are directed to authentication and authorization requests that include information identifying an access manager to which subsequent requests should be directed. The information can be processed by a load balancer receiving the request, to enable the load balancer to direct the request to the identified access manager. In some embodiments, this information is the same as, or derived from, the identifier contained in a token sent to an access management agent.

In some embodiments, an access manager, after successfully authenticating a user and establishing a session, may generate claims including an identifier of the access manager. In the field of computer security, claims are statements that an entity makes about itself or about another entity. Claims can be bundled into tokens used for authentication or authorization. In some embodiments, the access manager generates the identifier and places the identifier as a claim within a token, in addition to generating any other claims that may be required for the token. The token may then be sent to the access management agent requesting the authentication. The access management agent may then use the token for subsequent authentications or authorizations.

In addition to using the token as an authentication or authorization mechanism, the access management agent may configure itself based on the identifier to submit subsequent requests for authentications and authorizations that are received during the same session to the same access manager indicated by the identifier. For example, upon receiving the token, the access management agent may look up a network address of the access manager and/or the data center and/or cluster of the access manager using the identifier, then store the address in a configuration file that the access management agent references when processing a subsequent request. In addition, the access management agent may be configured to include the identifier or information derived from the identifier (e.g., the server name) when sending the subsequent request, so that any intervening entities (e.g., load balancers) between the access management agent and the access manager are informed about the identity of the access manager. Including the identifier in the subsequent request facilitates stickiness when the intervening entity is involved in selecting which access manager will service the request (e.g., when the intervening entity is a load balancer). In this way, the access management agent may use the identifier to maintain session stickiness and/or affinity across authentication and authorization communication channels.

FIG. 1 is a block diagram of a network environment 100 for maintaining session stickiness across authentication and authorization channels, according to one embodiment. The network environment 100 comprises an AMS 105, which includes a data center 140 and a computer system 120. The network environment 100 further comprises a client device 110 communicatively linked to the computer system 120, which includes an access management agent (herein referred to as AM agent) 122. In one embodiment, the AM agent 122 may be a software application hosted on the computer system 120, such as a web server, as previously discussed. Thus, the AM agent 122 can be a webgate. It is understood that the AM agent 122 may be implemented in other ways in alternative embodiments, such as a standalone device, a computer system, a software application hosted by a computer system or server, or any other suitable implementation suitable for facilitating authentications and authorizations and communicating with access managers.

The data center 140 may comprise a first access manager 142a and a second access manager 142b, which can be in the same or different clusters. In one embodiment, an access manager 142 may be a physical server system comprising hardware components, as previously discussed. Alternatively, an access manager 142 may be a virtualized server instantiated on one or more computer systems in the data center 140. It is understood that other implementations of the access manager may be possible in alternative embodiments.

The access manager 142a may be communicatively connected with the AM agent 122 via two communication channels. In one embodiment, a first communication channel may be a front channel 132 that is browser-facing and used for communications involving a web browser on the client device 110. The front channel may use a browser-facing communication protocol such as HTTP. In addition, a second communication channel may be a back channel 134a that is server-facing and used for communications between the AM agent 122 and the access manager 142a. The back channel 134a may use a server-facing communication protocol such as OAP. The access manager 142a may also be communicatively connected with other access managers 142, such as the second access manager 142b, within the same data center 140 via another back channel 134c.

In one embodiment, the AM agent 122 may send authentication requests to the access manager 142a using the front channel 132. In response, the access manager 142a may process the authentication request. Upon successful authentication, the access manager 142a may establish a server-side session 146a for which the access manager 142a stores session information. In one embodiment, the session information may be maintained in a distributed cache. It is understood that the session information for the session 146a may also be maintained in other ways in alternative embodiments as known in the art, such as in memory within the access manager 142a or within the data center 140. Next, the access manager 142a may generate an access manager identifier 144a and send the identifier 144a to the AM agent 122. The identifier 144a can include information that uniquely identifies the access manager 142a. For example, the identifier 144a may comprise a cluster ID that identifies the server cluster that the access manager 142a belongs to and a server name of the access manager 142a. The identifier 144a may be sent to the AM agent 122, for example, as a data component inside an access token that may be used by the AM agent in submitting subsequent authorization and authentication requests. For example, the identifier 144a may be included into an authentication token and/or an authorization token. The token(s) can include additional information for the session, such as a session ID, a timestamp indicating when the session was created and/or how long the session is valid for, a user ID or other user credentials, etc. The access manager 142a may encrypt the token(s) for transmission to the AM agent.

After receiving the identifier 144a, the AM agent 122 may subsequently submit an authorization request via the back channel 134a along with the token containing the identifier 144a. Using the identifier 144a, the AM agent 122 is able to direct the authorization request to the same data center 140 and access manager 142a that had previously processed the authentication request. In this way, the same session 146a may be used to complete authentication and authorization, thereby maintaining session stickiness and/or affinity across front (authentication) 132 and back (authorization) channels 134a.

This approach yields savings in time and computational resources because the AMS no longer has to recreate and/or adopt session 146a as a new session 146b in another access manager, e.g., across back channel 134c. This also results in improved security for the AMS. A separate identifier 144b may similarly be used to maintain stickiness and/or affinity across communication channels between the AM agent 122 and the access manager 142b, e.g., across a back channel 134b when the initial authentication is performed by the access manager 142b rather than the access manager 142a. Since the example of FIG. 1 assumes that the authentication is performed by access manager 142a, the channel by which an authentication request is sent to the access manager 142b has been omitted from the figure for simplicity.

Figure 2:
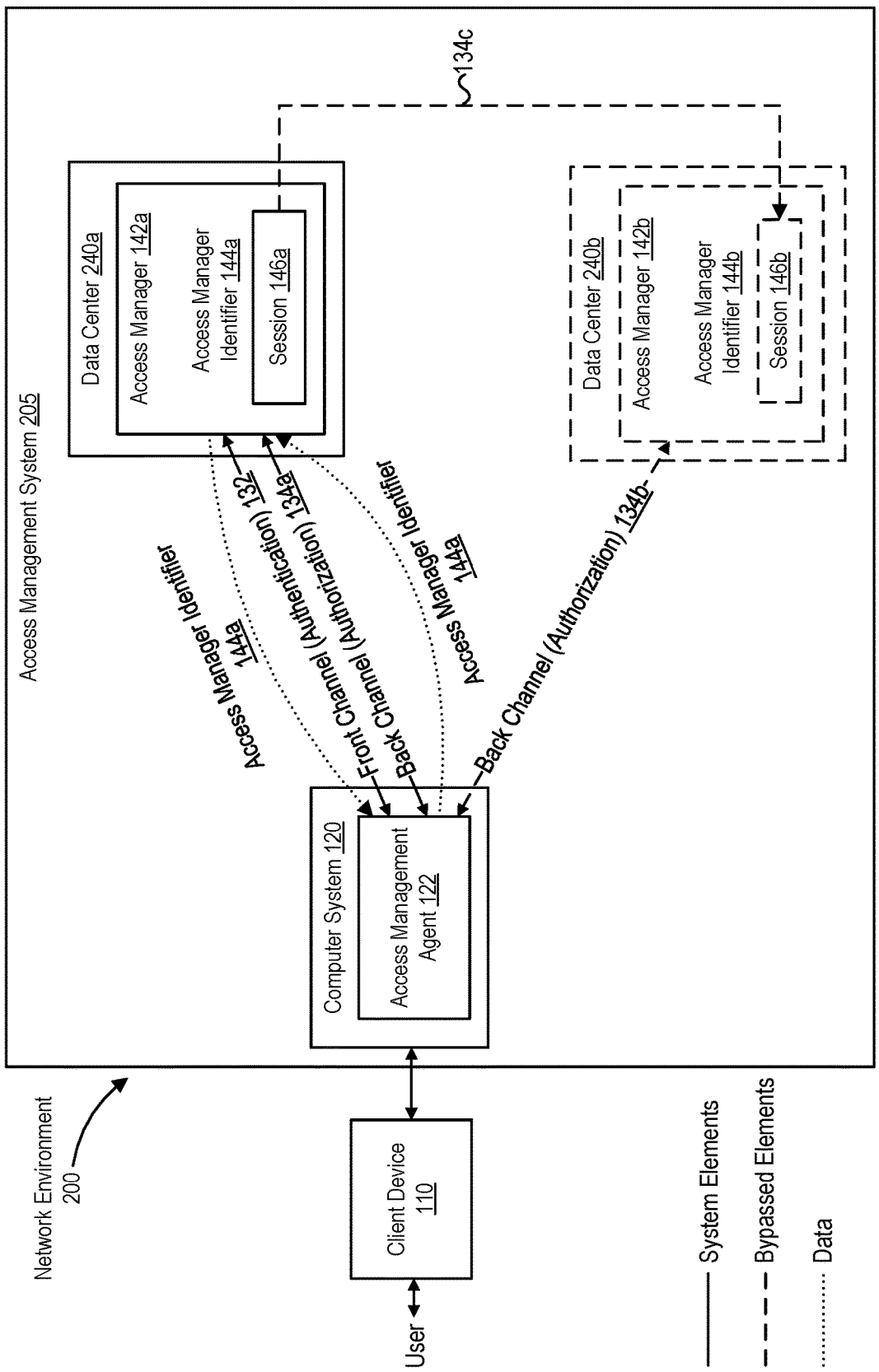
FIG. 2 illustrates a network environment for maintaining session stickiness across authentication and authorization channels, in accordance with an embodiment.

FIG. 2 shows a block diagram of a network environment 200 for maintaining session stickiness across authentication and authorization channels. The network environment 200 comprises an access management system 205 that includes the computer system 120 from FIG. 1, but where the access managers 142a and 142b are located in two different data centers 240a and 240b, respectively. FIG. 2 further highlights how using the identifier 144a allows the AM agent 122 to redirect authorization requests to the same access manager 142a that performed the authentication, thereby bypassing the second access manager 142b at the second data center 240b. Using this approach, the AM agent 122 avoids potentially submitting, via back channel 134b, authorization requests to an access manager 142, such as access manager 142b, that is different from the access manager 142a that performed the earlier authentication. This approach further avoids having the second access manager 142b process the authorization request from the AM agent 122 by recreating and/or adopting the session 146a from access manager 142a as a new session (e.g., the session 146b) at access manager 142b across back channel 134c. Recreating or adoption the session may be especially costly as a result of having to transfer data across two data centers 240a and 240b, which may be located in different geographical places across potentially long distances. Such a costly data transfer may also introduce security risks as the transfer could be intercepted along route. As with the embodiment of FIG. 1, a separate identifier (e.g., the identifier 144b) can be used to redirect authorization requests to the access manager 142b when the initial authentication is performed by the access manager 142b.

FIGS. 1 and 2 are simplified block diagrams that omit additional entities that may be involved in maintaining stickiness and/or affinity. For example, as explained earlier, requests may be received by load balancers, which can use an identifier for an access manager to determine where to direct a request. Load balancers can be centralized (e.g., to direct a request to a particular access manager located in one of multiple data centers) or internal to a data center (e.g., to direct a request to a particular access manager in a particular cluster within the data center).

Figure 3:
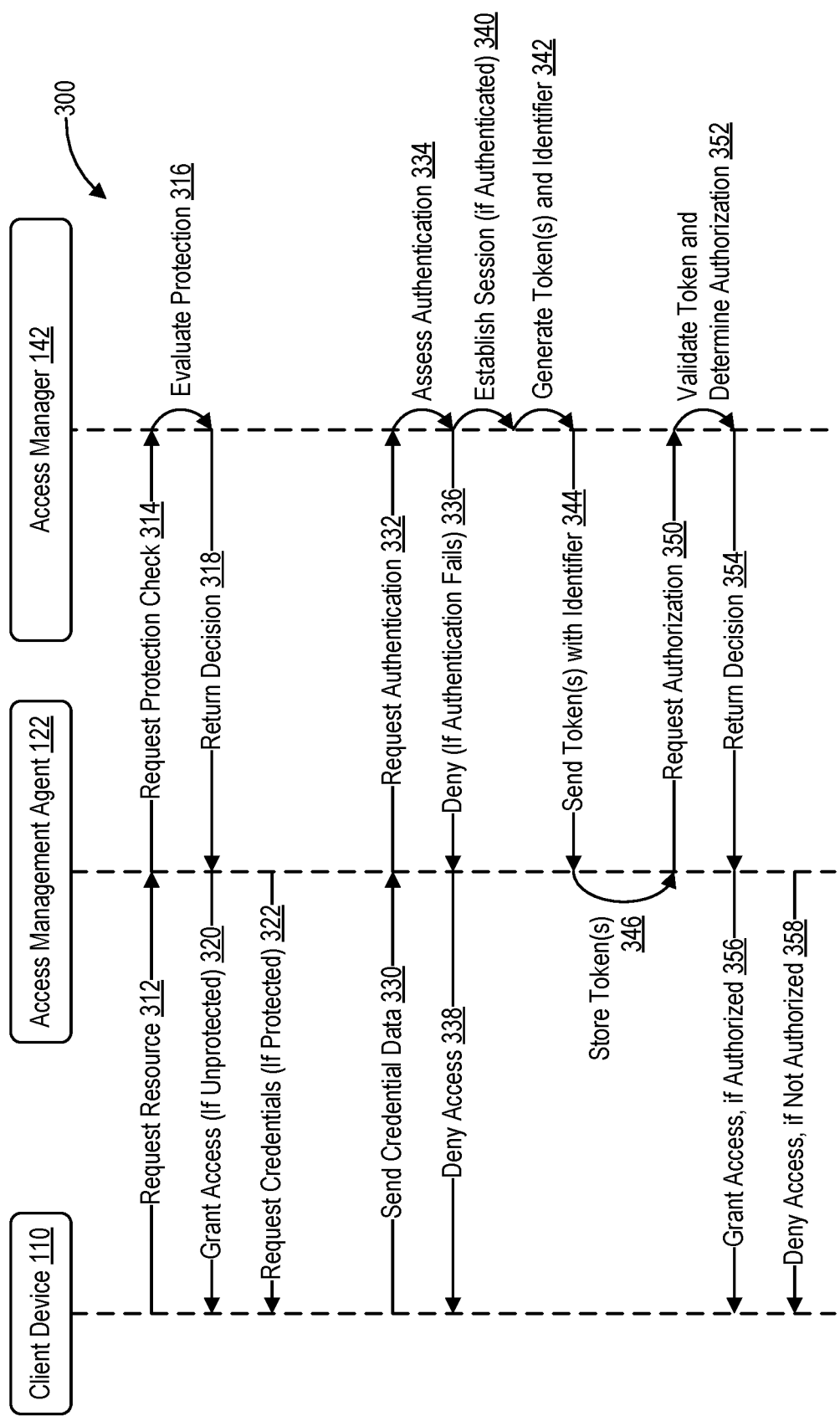
FIG. 3 illustrates a sequence diagram, in accordance with an embodiment.

FIG. 3 illustrates a sequence diagram of a method 300 performed by an AMS, according to one embodiment. At step 312, a user using the client device 110 may submit a request to the AM agent 122 to access a resource. At step 314, the AM agent 122 may send a request to a particular access manager 142 to check the protection status of the resource. The particular access manager 142 can be selected in various ways. For example, the AM agent 122 may select the access manager based on the resource for which access is requested. As another example, a load balancer receiving the request from the AM agent 122 could select the access manager based on availability at the time of the request. At step 316, the access manager 142 may evaluate the protection status and return a decision (indicating access granted) to the AM agent 122 at step 318. If the resource is determined to be unprotected, the AM agent 122 may grant access to the resource at step 320. Otherwise, the AM agent 122 may send a request to the client device 110 for the user's credential information at step 322. In one embodiment, the credential information may be the user's username and password. However, it is understood that credential information may include other types of information.

At step 330, the user may input credential information and the client device 110 may send credential data to the AM agent 122. At step 332, the AM agent 122 may send an authentication request to the access manager 142 along with the credential information. The access manager 142 may then assess authentication of the user based on the credential information at step 334. In one embodiment, the access manager 142 may compare the received credential information with data stored, e.g., in an ID store in memory at the access manager 142. If authentication fails, the access manager 142 may then return a decision (indicating access denied) to the AM agent 122 at step 336. The AM agent 122 may then notify the client device 110 that access to the resource has been denied at step 338. At step 340, if authentication succeeds, the access manager 142 may establish a session, such as an SSO session, which the access manager 142 configures based on information about the request, resource, user, and the client device 110.

At step 342, the access manager 142 may generate one or more tokens (e.g., a front channel token used for re-authentication and a back channel token used for authorization) and generate an identifier 144 that identifies the access manager 142. At step 344, the access manager may place the identifier 144 in one or more of the generated tokens and send the token(s) to the AM agent 122. At step 346, the AM agent 122 may store the token(s) in a data store accessible to the AM agent 122.

At step 350, using the identifier 144, the AM agent 122 may submit an authorization request to the same access manager 142, along with a token comprising the identifier 144. At step 352, the access manager 142 may validate the token against a token that was previously generated in step 342 to determine whether the user of the client device 110 has authorization to access the requested resource. At step 354, the access manager 142 may return a decision indicating whether authorization was successful to the AM agent 122. At step 356, the AM agent 122 may grant access to the resource if authorization was successful. Otherwise, at step 358, the AM agent 122 may notify the client device 110 that access was not authorized.

Figure 4:
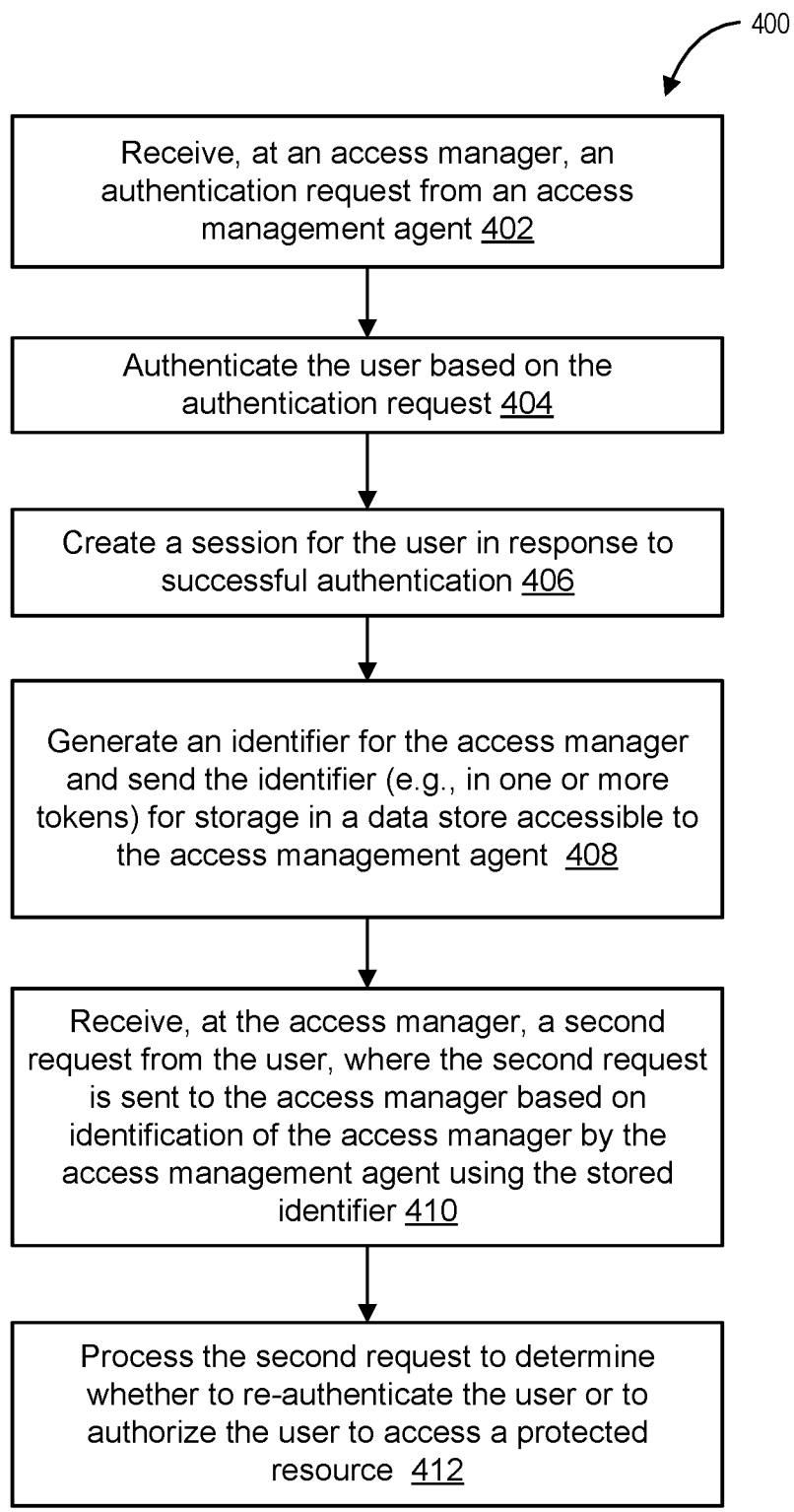
FIG. 4 is a flowchart of a method for maintaining session stickiness across authentication and authorization channels using an access manager, in accordance with an embodiment.

FIG. 4 illustrates a method 400 for maintaining session stickiness across authentication and authorization channels. The method 400 can be performed by an access manager, e.g., an instance of access manager 142. At step 402, the access manager 142 receives an authentication request from an AM agent, e.g., AM agent 122. The authentication request may have been triggered by a user request for a protected resource without having established a session for the user. The authentication request may include credential information such as a username and/or a password.

At step 404, the access manager authenticates the user based on the authentication request, for example by comparing credential information in the request to stored credentials for the user.

At step 406, the access manager creates a session for the user in response to successful authentication. The access manager may provide the AM agent with information about the session, such as a session ID, a timestamp for when the session was created, one or more user credentials by which the user was authenticated in step 404, etc. The access manager may send this session information to the AM agent using a token such as an authentication token and/or an authorization token. A token may include other items of information, such as a time-to-live (TTL) parameter that indicates how long the token may be used for subsequent authentications and/or authorizations. The TTL parameter may correspond to the time period for which the session is valid. Alternatively, the TTL parameter may correspond to a shorter time period, in which case the AM agent may need to obtain a new token at a later time during the session.

At step 408, the access manager generates an identifier by which the access manager can be uniquely identified. For example, as discussed earlier, the identifier can include a server name and a cluster ID. The access manager may store the identifier along with other session information in a data store accessible to the access manager, but not the AM agent. The access manager may also send the identifier to the AM agent for storage in a data store accessible to the AM agent. The access manager and the AM agent may both store the identifier for the session, e.g., in association with the session ID. The identifier can be sent to the AM agent together with session information or separately. In one embodiment, the identifier and the session information are packaged together into one or more tokens that the AM agent can present to the access manager during a subsequent request.

At step 410, the access manager receives a second request from the user during the session. The second request can be an authorization request that is for the protected resource in step 402 or for a different resource. The access manager may receive the second request while the session is still valid. Alternatively, the second request may be received in connection with re-establishing the session (e.g., after expiration of a time period for which the session was valid) or in connection with establishing a new session at the same access manager. The second request is sent from the AM agent to the access manager based on the AM agent identifying the access manager using the identifier that was sent in step 408.

At step 412, the access manager processes the second request to determine whether to re-authenticate the user (if the second request is an authentication request) or to authorize the user (if the second request is an authorization request). The processing of the second request may include comparing information in a token included in the second request to session information and/or token information that the access manager stored earlier.

Figure 5:
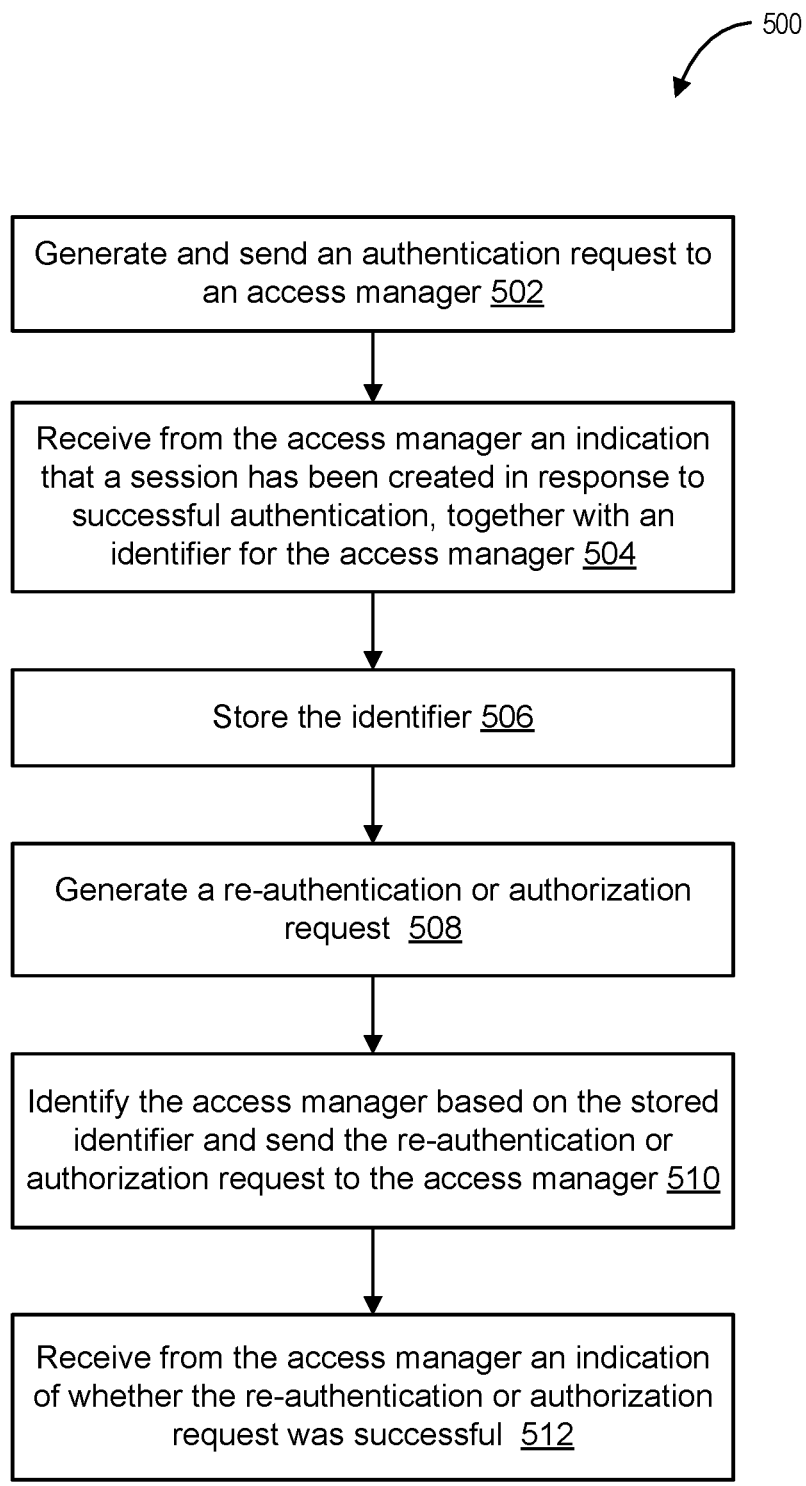
FIG. 5 is a flowchart of a method for maintaining session stickiness across authentication and authorization channels using an access management agent, in accordance with an embodiment.

FIG. 5 illustrates a method 500 for maintaining session stickiness across authentication and authorization channels. The method 500 can be performed by an AM agent, e.g., the AM agent 122. At step 502, the AM agent generates and sends an authentication request to an access manager, e.g., an instance of access manager 142. The authentication request may be triggered by a user request for a protected resource, with the AM agent intercepting the user request to determine that authentication is needed. The authentication request may include credential information that the AM agent requested from the user in response to determining that authentication is needed.

At step 504, the AM agent receives an indication from the access manager that a session has been created for the user in response to successful authentication based on the authentication request. The AM agent also receives an identifier for the access manager. The indication that the session was created may include session information which, as mentioned earlier, can be provided to the AM agent in the form of one or more tokens that also include the identifier.

At step 506, the AM agent may store the identifier in a data store for use with subsequent authentication or authorization requests. The identifier may be stored for the session, e.g., in association with the session ID. In some embodiments, the AM agent may extract the identifier and store it separately from the token. The AM agent may use the identifier to update a configuration file, lookup table or other data structure from which the AM agent determines where to send subsequent requests. Alternatively, the AM agent may store the token and analyze the contents of the token to identify the access manager when generating a subsequent request.

At step 508, the AM agent generates a re-authentication or authorization request that corresponds to the second request discussed earlier in connection with step 410 of FIG. 4.

At step 510, the AM agent identifies the access manager that created the session in step 504, based on the stored identifier. For example, the AM agent may use the identifier to determine the data center where the access manager is located, the cluster to which the access manager belongs, and the location of the access manager within the cluster. The AM agent then sends the re-authentication or authorization request to the access manager.

At step 512, the AM agent receives from the access manager an indication of whether the re-authentication or authorization was successful. The AM agent can then grant or deny access to a protected resource based on this indication.

Figure 6:
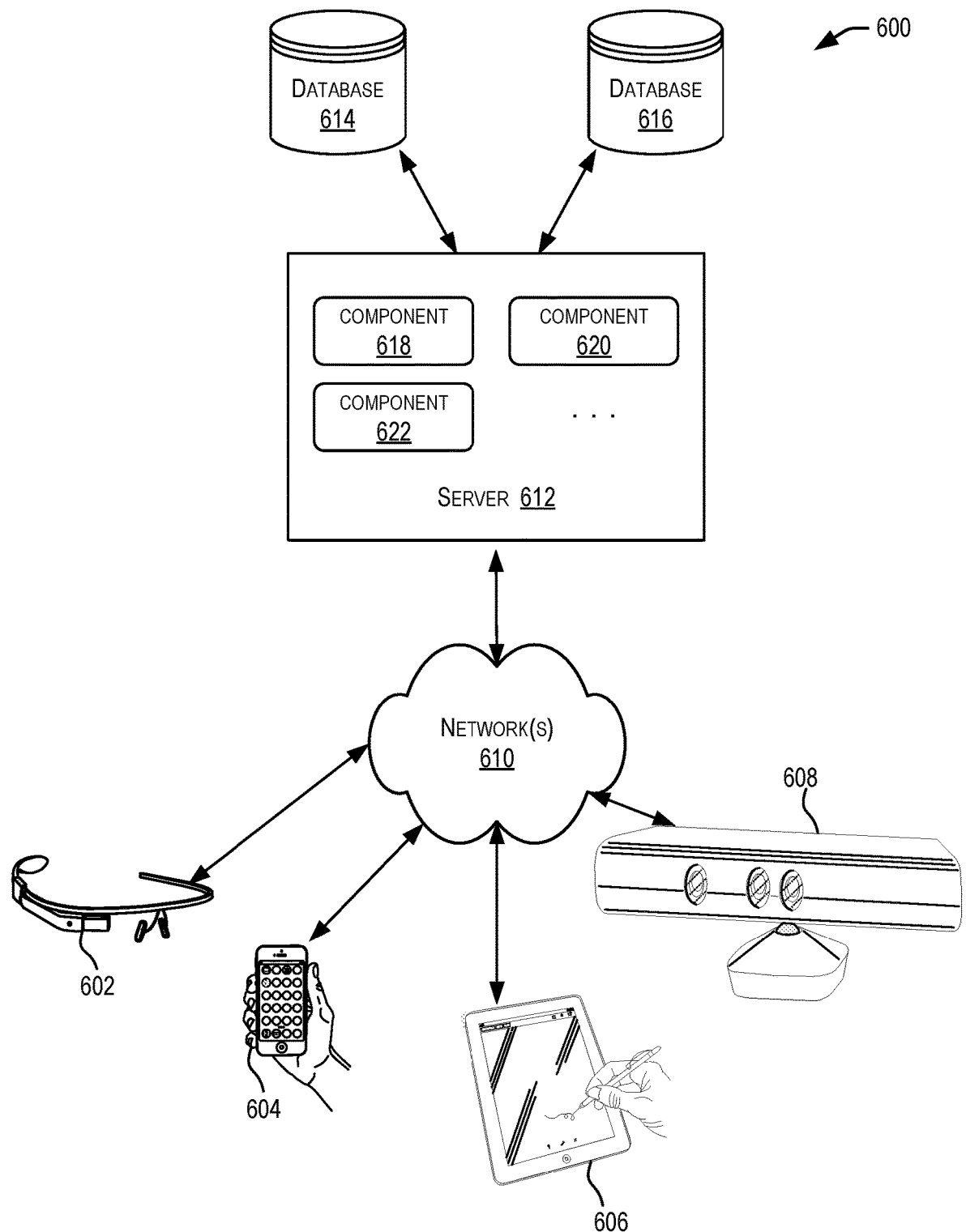
FIG. 6 is a simplified diagram of a distributed system for implementing one or more of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
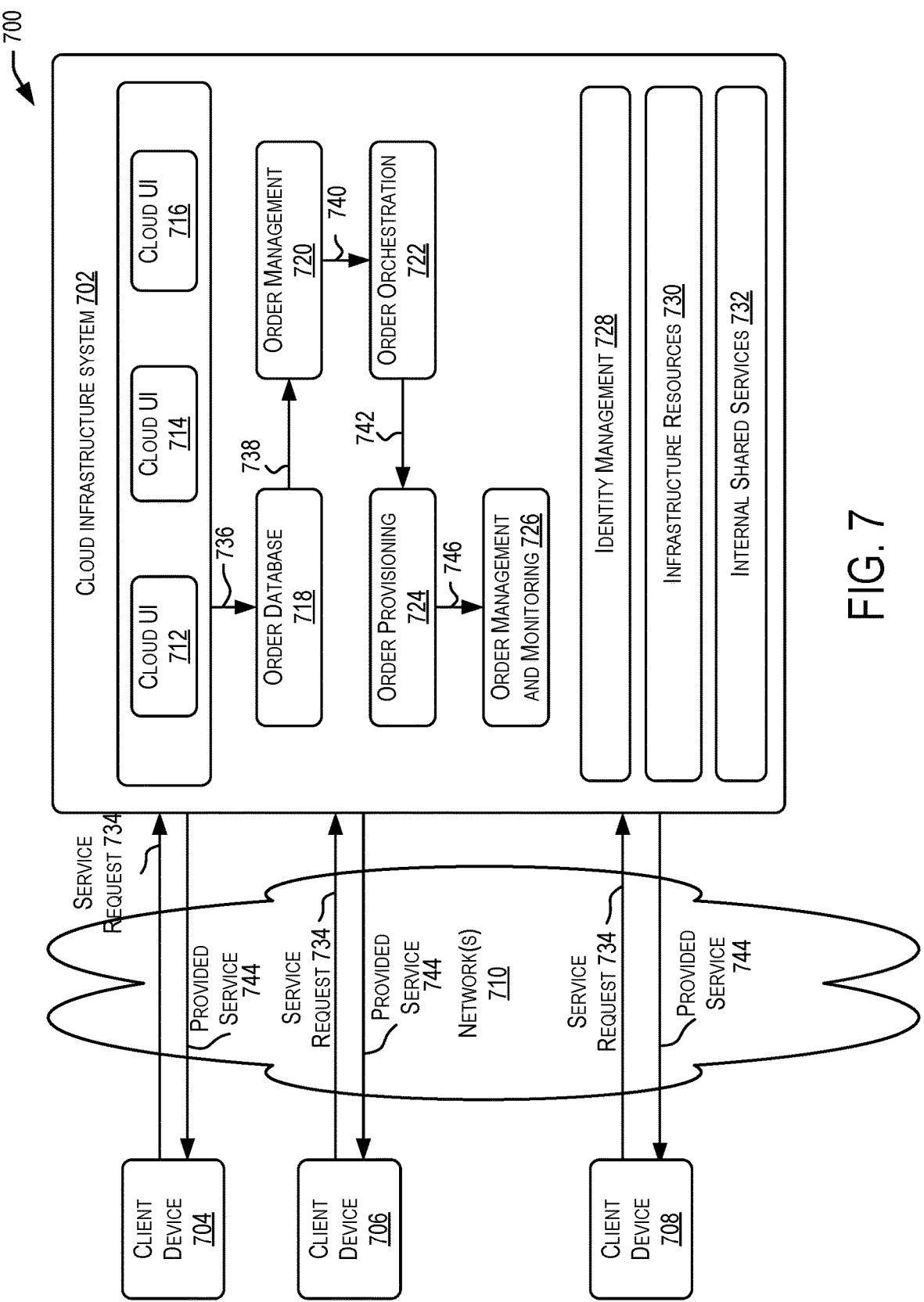
FIG. 7 is a simplified block diagram depicting a system environment by which services provided by one or more components of an embodiment system may be offered as cloud services, in accordance with an embodiment.

FIG. 7 is a simplified block diagram depicting a system environment 700 by which services provided by one or more components of an embodiment system may be offered as cloud services, in accordance with an embodiment. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a User Interface (UI), such as cloud UI 712, cloud UI 714, cloud UI 716, a web interface and/or other UI and place a subscription order via these UIs. The order information received by cloud infrastructure system 702 in response to the customer placing an order may include information identifying the customer and one or more services offered by the cloud infrastructure system 702 that the customer intends to subscribe to. After an order has been placed by the customer, the order information is received via one or more of the UIs, e.g., via cloud UIs, 712, 714 and/or 716.

At operation 736, the order is stored in order database 718. Order database 718 can be one of several databases operated by cloud infrastructure system 702 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 702 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, the services and resources are provided to the requesting client device(s) and a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 702 may include an identity management module 728. Identity management module 728 may be configured to provide identity services, such as access management and authorization services in cloud infrastructure system 702. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
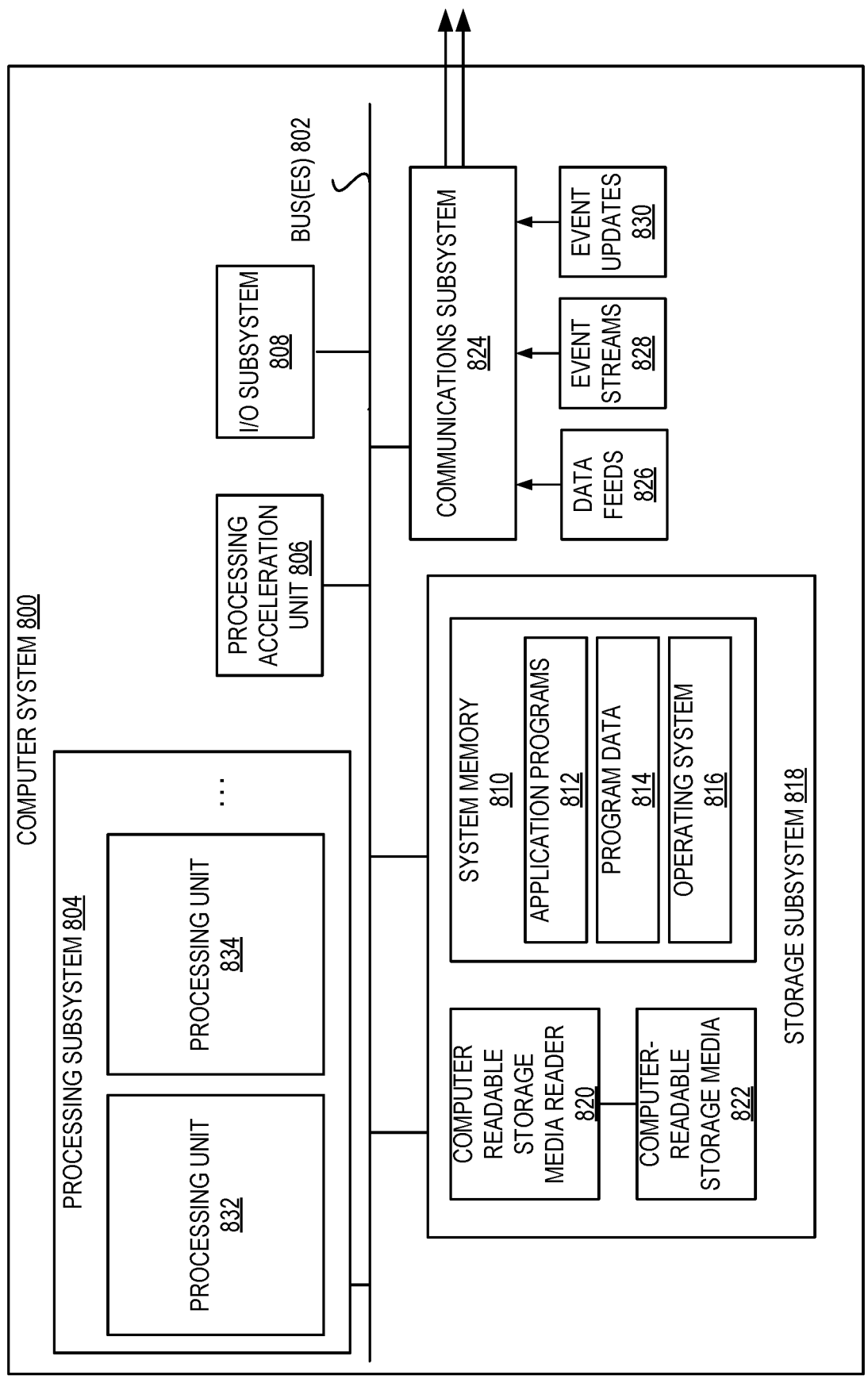
FIG. 8 illustrates an exemplary computer system, in which various embodiments of the present disclosure may be implemented.

FIG. 8 illustrates an exemplary computer system 800, in which various embodiments may be implemented. The system 800 may be used to implement any of the computer systems described above. As shown in the figure, computer system 800 includes a processing subsystem 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing subsystem 804, which can be implemented as one or more integrated circuits (e.g., a conventional microprocessor or microcontroller), controls the operation of computer system 800. One or more processors may be included in processing subsystem 804. These processors may include single core or multicore processors. In certain embodiments, processing subsystem 804 may be implemented as one or more independent processing units 832 and/or 834 with single or multicore processors included in each processing unit. In other embodiments, processing subsystem 804 may also be implemented as a quad-core processing unit formed by integrating two dual-core processors into a single chip.

In various embodiments, processing subsystem 804 can execute a variety of programs in response to program code and can maintain multiple concurrently executing programs or processes. At any given time, some or all of the program code to be executed can be resident in processor(s) of the processing subsystem 804 and/or in storage subsystem 818. Through suitable programming, processor(s) of the processing subsystem 804 can provide various functionalities described above. The processing acceleration unit 806 can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing subsystem 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing subsystem 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing subsystem 804. Storage subsystem 818 may also provide a repository for storing data used in accordance an embodiment.

Storage subsystem 818 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the present disclosure are described with reference to specific embodiments thereof, but those skilled in the art will recognize that the present disclosure is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
receiving, by an access management agent implemented using a computer system comprising at least one hardware processor and a memory, from a first access manager, a token that includes an identifier that identifies the first access manager, wherein the token is either an authentication token or an authorization token, and wherein the first access manager created a session and generated the token in response to successful authentication of a user based on a first request;
storing, by the access management agent, for the session, the token that includes the identifier that identifies the first access manager, wherein the first access manager is part of a plurality of access managers, and wherein the access managers in the plurality of access managers belong to different data centers, the first access manager belonging to a first data center;
receiving, by the access management agent, from the user during the session, a second request for authentication or authorization of the user;

determining, by the access management agent, based on the identifier that identifies the first access manager included in the token being stored for the session, that, from among the plurality of access managers, the first access manager is to be used for processing the second request; and in response to the determining, sending, by the access management agent, to the first data center of the first access manager, the second request for authentication or authorization of the user, wherein the first access manager processes the second request to authenticate or authorize the user.

2. The method of claim 1, further comprising:

generating, by the access management agent, the first request that is an authentication request; and sending, by the access management agent, the first request to the first access manager.

3. The method of claim 2, further comprising:

receiving, by the access management agent, from the user, a user request for a protected resource;

determining, by the access management agent, that authentication is needed;

sending, by the access management agent, to the user, a request for credential information; and receiving, by the access management agent, from the user, the credential information, wherein the credential information is included in the first request.

4. The method of claim 1, wherein the first access manager generates the identifier that identifies the first access manager.

5. The method of claim 1, wherein the second request for authentication or authorization of the user includes the token, and wherein the first access manager processes the second request based on the token.

6. The method of claim 1, wherein the access managers in the plurality of access managers belong to different server clusters, and wherein the identifier that identifies the first access manager includes information identifying a server cluster to which the first access manager belongs.

7. The method of claim 1, wherein the second request for authentication or authorization of the user is a request to re-authenticate the user.

8. The method of claim 1, wherein the second request for authentication or authorization of the user is a request to authorize the user to access a resource.

9. A system, comprising:

an access management agent implemented using a computer system comprising at least one hardware processor and a memory, wherein the access management agent is configured to:

receive, from a first access manager, a token that includes an identifier that identifies the first access manager, wherein the token is either an authentication token or an authorization token, and wherein the first access manager created a session and generated the token in response to successful authentication of a user based on a first request;

store, for the session, the token that includes the identifier that identifies the first access manager, wherein the first access manager is part of a plurality of access managers, and wherein the access managers in the plurality of access managers belong to different data centers, the first access manager belonging to a first data center;

receive, from the user during the session, a second request for authentication or authorization of the user;

determine, based on the identifier that identifies the first access manager included in the token being stored for the session, that, from among the plurality of access managers, the first access manager is to be used for processing the second request; and in response to the determining, send, to the first data center of the first access manager, the second request for authentication or authorization of the user, wherein the first access manager processes the second request to authenticate or authorize the user.

10. The system of claim 9, further comprising:

the first access manager configured to:

authenticate the user;

create the session in response to the successful authentication of the user;

generate the token that includes the identifier that identifies the first access manager;

send, to the access management agent for storage, the token including the identifier that identifies the first access manager;

receive, from the access management agent, the second request for authentication or authorization of the user; and process the second request to authenticate or authorize the user.

11. The system of claim 9, wherein the access managers in the plurality of access managers belong to different server clusters, and wherein the identifier that identifies the first access manager includes information identifying a server cluster to which the first access manager belongs.

12. The system of claim 9, further comprising:

the first data center including the first access manager, wherein at least some of the access managers in the plurality of access managers belong to a second data center.

13. The system of claim 9, further comprising:

a load balancer configured to direct the second request to authenticate or authorize the user to the first access manager based on the identifier that identifies the first access manager being included in the second request.

14. The system of claim 9, wherein the second request includes the token, and wherein the token includes session information.

15. The system of claim 9, wherein the access management agent is further configured to send the first request to the first access manager over a first channel and to send the second request to the first access manager over a second channel, and wherein the first channel and the second channel use different communication protocols.

16. The system of claim 15, wherein the first channel uses Hypertext Transfer Protocol (HTTP) and the second channel uses Oracle Access Protocol (OAP).

17. A non-transitory computer-readable storage medium storing a plurality of instructions that, when executed by one or more processors of a computer system, cause the one or more processors to:

receive, from a first access manager, a token that includes an identifier that identifies the first access manager, wherein the token is either an authentication token or an authorization token, and wherein the first access manager created a session and generated the token in response to successful authentication of a user based on a first request;

store, for the session, the token that includes the identifier that identifies the first access manager, wherein the first access manager is part of a plurality of access managers, and wherein the access managers in the plurality of access managers belong to different data centers, the first access manager belonging to a first data center;

receive, from the user during the session, a second request for authentication or authorization of the user;

determine, based on the identifier that identifies the first access manager included in the token being stored for the session, that, from among the plurality of access managers, the first access manager is to be used for processing the second request; and in response to the determining, send, to the first data center of the first access manager, the second request for authentication or authorization of the user, wherein the first access manager processes the second request to authenticate or authorize the user.

18. The method of claim 1, further comprising:

sending, by the access management agent, the token to a client device of the user, wherein the client device stores the token, and wherein the second request for authentication or authorization of the user includes the token.

\* \* \* \* \*

UNITED STATES PATENT AND TRADEMARK OFFICE
CERTIFICATE OF CORRECTION

| | |
|---|---|
| PATENT NO. | : 11,658,958 B2 |
| APPLICATION NO. | : 17/325636 |
| DATED | : May 23, 2023 |
| INVENTOR(S) | : Mathew et al. |

It is certified that error appears in the above-identified patent and that said Letters Patent is hereby corrected as shown below:

On the Title Page

Column 2, under Abstract, Lines 6-7, delete "response to response to" and insert -- response to --, therefor.

On page 5, Column 1, under Other Publications, Line 6, delete "page!lmplementing" and insert -- page!Implementing --, therefor.

On page 5, Column 2, under Other Publications, Line 11, delete "lmpersonation" and insert -- Impersonation --, therefor.

In the Specification

In Column 14, Line 62, delete "infra-red" and insert -- infrared --, therefor.

In Column 23, Line 25, delete "evolution)," and insert -- evolution)), --, therefor.

Signed and Sealed this
Twentieth Day of February, 2024

Katherine Kelly Vidal
*Director of the United States Patent and Trademark Office*